(12) United States Patent
Hadas et al.

(10) Patent No.: US 7,643,504 B2
(45) Date of Patent: Jan. 5, 2010

(54) CREDIT BASED FLOW CONTROL IN AN ASYMMETRIC CHANNEL ENVIRONMENT

(75) Inventors: Yair Hadas, Sunnyvale, CA (US); Avraham Shalev, Tel Aviv (IL)

(73) Assignee: Applied Micro Circuits Corporation, San Diego, CA (US)

( * ) Notice: Subject to any disclaimer, the term of this patent is extended or adjusted under 35 U.S.C. 154(b) by 456 days.

(21) Appl. No.: 11/605,790

(22) Filed: Nov. 29, 2006

(65) Prior Publication Data

US 2008/0123526 A1 May 29, 2008

(51) Int. Cl.
*H04L 12/56* (2006.01)
(52) U.S. Cl. ...................... 370/412; 370/449
(58) Field of Classification Search ......... 370/229–237, 370/351, 389, 395.1, 395.5, 395.53, 449–451, 370/412–419, 431; 710/1, 52, 56, 57, 58, 710/100, 305, 306, 310
See application file for complete search history.

(56) References Cited

U.S. PATENT DOCUMENTS

| 5,313,454 | A | * | 5/1994 | Bustini et al. ............... 370/231 |
|---|---|---|---|---|
| 5,748,613 | A | * | 5/1998 | Kilk et al. ................... 370/231 |
| 6,683,850 | B1 | * | 1/2004 | Dunning et al. ............. 370/231 |
| 7,050,394 | B2 | | 5/2006 | Johnson et al. .......... 370/230.1 |
| 7,065,050 | B1 | * | 6/2006 | Herbst ........................ 370/235 |
| 2002/0191543 | A1 | * | 12/2002 | Buskirk et al. ........... 370/230.1 |

FOREIGN PATENT DOCUMENTS

WO   WO 9966677 A1 * 12/1999

* cited by examiner

*Primary Examiner*—Kwang B Yao
*Assistant Examiner*—Obaidul Huq
(74) *Attorney, Agent, or Firm*—Law Office of Gerald Maliszewski; Gerald Maliszewski

(57) ABSTRACT

A system and method are provided for controlling information flow from a channel service module (CSM) in an asymmetric channel environment. The method provides information for transmission to an OSI model PHY (physical) layer device with a channel buffer. The PHY device channel buffer current capacity is estimated. Information is sent to the channel buffer responsive to estimating the channel buffer capacity, prior to receiving a Polling Result message from the PHY device. Initially, Polling Request messages are sent to the PHY device, and Polling Result messages received from the PHY device, as is conventional. In response to analyzing the Polling messages, a transmission pattern is determined, which includes the amount of information to transmit and a period between transmissions.

18 Claims, 4 Drawing Sheets

| OC48 | OC24 | OC12 | OC3 | OC1 |
|------|------|------|-----|-----|
| 0 | 0 | 0 | 0 | 0 |
| | | | | 1 |
| | | | | 2 |
| | | | 3 | 3 |
| | | | | 4 |
| | | | | 5 |
| | | | 6 | 6 |
| | | | | 7 |
| | | | | 8 |
| | | | 9 | 9 |
| | | | | 10 |
| | | | | 11 |
| | | 12 | 12 | 12 |
| | | | | 13 |
| | | | | 14 |
| | | | 15 | 15 |
| | | | | 16 |
| | | | | 17 |
| | | | 18 | 18 |
| | | | | 19 |
| | | | | 20 |
| | | | 21 | 21 |
| | | | | 22 |
| | | | | 23 |
| | 24 | 24 | 24 | 24 |
| | | | | 25 |
| | | | | 26 |
| | | | 27 | 27 |
| | | | | 28 |
| | | | | 29 |
| | | | 30 | 30 |
| | | | | 31 |
| | | | | 32 |
| | | | 33 | 33 |
| | | | | 34 |
| | | | | 35 |
| | | 36 | 36 | 36 |
| | | | | 37 |
| | | | | 38 |
| | | | 39 | 39 |
| | | | | 40 |
| | | | | 41 |
| | | | 42 | 42 |
| | | | | 43 |
| | | | | 44 |
| | | | 45 | 45 |
| | | | | 46 |
| | | | | 47 |

*FIG. 3*

CREDIT BASED FLOW CONTROL IN AN ASYMMETRIC CHANNEL ENVIRONMENT

BACKGROUND OF THE INVENTION

1. Field of the Invention

This invention generally relates to digital communications and, more particularly to a system and method for controlling the flow of information in an asymmetric channel environment.

2. Description of the Related Art

As noted in U.S. Pat. No. 7,050,394, communicating over a network often involves a variety of tasks. For example, to send content (e.g., a web-page, e-mail, streaming video, etc.) from one device to another, the content is typically divided into portions carried by different packets. An individual packet includes a payload that stores some portion of the content being sent and a header that includes data used in delivering the packet to its destination. By analogy, the packet's payload is much like a letter being mailed while the header stores information (e.g., a network destination address) that appears on the envelope.

A typical router contains a line card for receiving data packets on one end, performing necessary conversions and sending out the packets at the other end. Among other components, line cards include a framer for framing/de-framing data packets, and a processor for performing protocol conversion and for controlling packet traffic. The framer communicates with the processor using a protocol such as SPI-3 or SPI-4 (system packet interface), which defines packet and cell transfer standards between a physical layer device (i.e., the framer) and a link layer device (i.e., the processor).

Generally, before transmission, a framer maps one or more packets (or packet portions) into a logical organization of bits known as a frame. In addition to packet data, a frame often includes flags (e.g., start and end of frame flags), a frame checksum that enables a receiver to determine whether transmission errors occurred, and so forth. The framer feeds frame bits to one or more devices that generate signals to be carried over a network connection. For example, for an optic signal, the framer feeds a serializer/deserializer (SERDES) and transceiver that generates optic signals representing the digital data of a frame.

Processing a received frame generally proceeds in the reverse of the process described above. That is, a device physically receives signals over a network connection, determines bit values corresponding to the signals, and passes the bits to a framer. The framer identifies frames within the bit stream and can extract packets stored within the frames.

In network terminology, the components described above perform tasks associated with different layers of a network communication "protocol stack." For example, the bottom layer, often known as the "physical layer", handles the physical generation and reception of signals. The "link layer" includes tasks associated with framing. Above the physical and link layers are layers that process packets (the "network layer") and coordinate communication between end-points (the "transport layer"). Above the transport layer sits the "application layer" that processes the content communicated.

Under-run and overrun are two common problems associated with the framing of data. Overrun involves the sending of too much data, or data at too high of a rate. In this case, data sent to the framer is lost before it can be buffered, which requires that the data be resent. Under-run is associated with sending too little data, or data at too slow of a rate. Some messaging protocols, such as Ethernet, are sensitive to under-run. Ethernet frames are only transmitted if they are "full" of data. Therefore, the transmission of entire Ethernet frames can be delayed as a result of under-run. Conventionally, the use of polling messages, which is a form of handshaking, addresses the overrun problem.

It would be advantageous if a framer or physical layer (PHY) device could be more efficiently supplied with information, to prevent under-run.

It would be advantageous if the different channels of a PHY device could be supplied with data at their optimal channel bandwidth to reduce the overall system latency.

SUMMARY OF THE INVENTION

Accordingly, a method is provided for controlling information flow from a channel service module (CSM) in an asymmetric channel environment. The method provides information for transmission to an OSI model PHY layer device with a channel buffer. The PHY device channel buffer current capacity is estimated. Information is sent to the channel buffer responsive to estimating the channel buffer capacity, prior to receiving a Polling Result message from the PHY device.

Initially, Polling Request messages to the PHY device, and Polling Result messages from the PHY device, as is conventional. In response to analyzing the Polling messages, a transmission pattern is determined. The determined pattern includes the amount of information to transmit and a period between transmissions.

Further, if the PHY device first channel buffer is operating at a particular bandwidth, then estimating the first channel buffer capacity includes determining a transmission pattern responsive to the first channel bandwidth. Typically, information is provided to a plurality of PHY device channel buffers. An unused portion in each of the plurality of channel buffers is estimated, information is sent to each channel buffer responsive to estimating a corresponding channel buffer current capacity. If the plurality of channel buffers operates at a corresponding plurality of bandwidths, then the capacity of each of the plurality of channel buffers is estimated in response to the channel bandwidth associated with the corresponding channel.

Additional details of the above-described method and a CSM transmit interface system, for controlling information flow in an asymmetric channel environment, are provided below.

BRIEF DESCRIPTION OF THE DRAWINGS

FIG. 3 is a diagram depicting exemplary asymmetric channel assignments.

DETAILED DESCRIPTION

Figure 1:
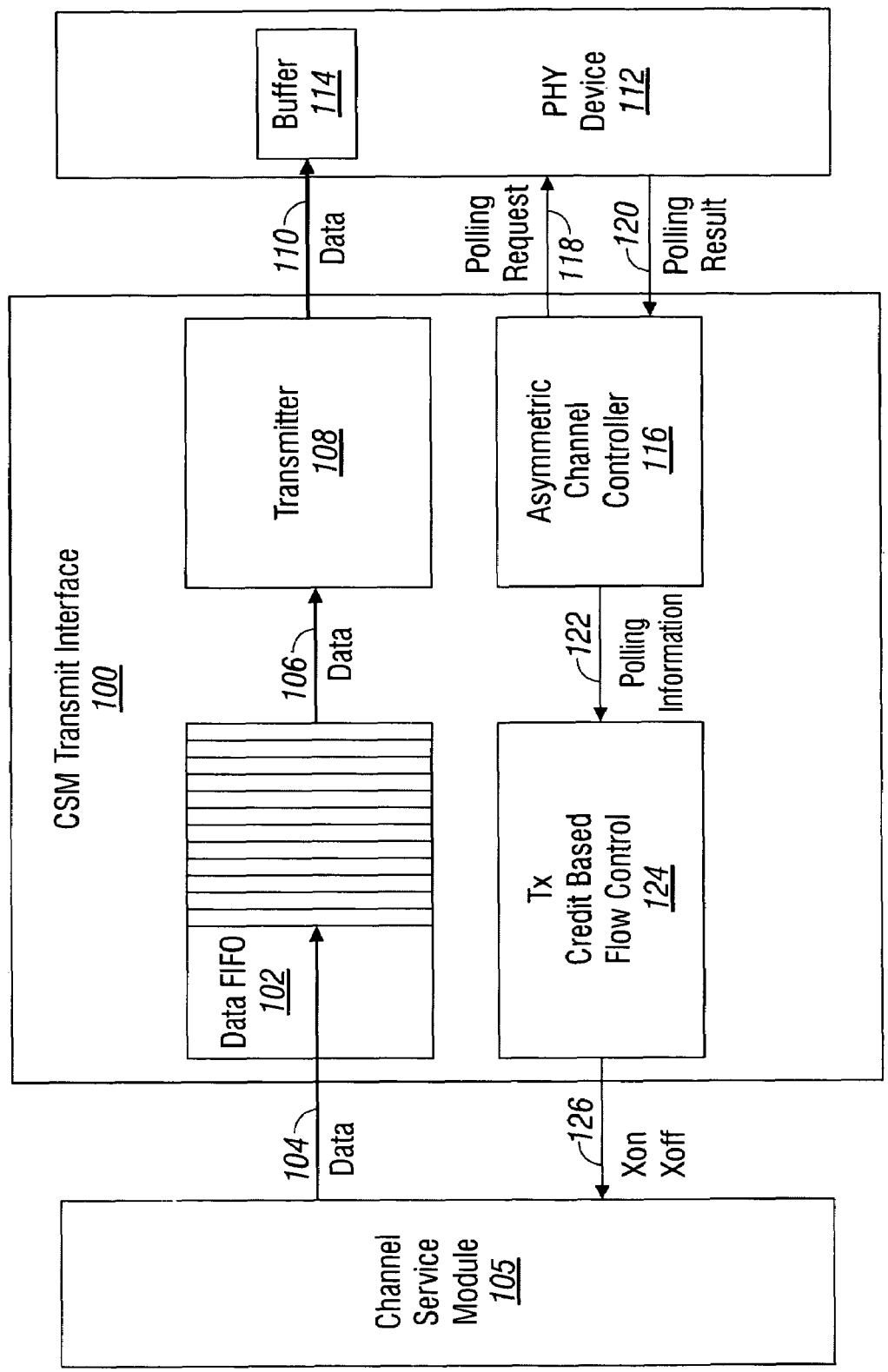
FIG. 1 is a schematic block diagram of a channel service module (CSM) transmit interface, with a system for controlling information flow in an asymmetric channel environment.

FIG. 1 is a schematic block diagram of a channel service module (CSM) transmit interface, with a system for controlling information flow in an asymmetric channel environment. Alternately, a CSM device may be referred to and a store-and-forward module. The system 100 comprises a data FIFO 102 having a CSM interface on line 104 to accept information from a CSM, and an output on line 106 to supply information. A transmitter 108 having an interface on line 106 accepts information from the data FIFO 102, and an external interface on line 110 transmits information to an OSI model PHY layer device 112 with a channel buffer 114. One example of a PHY device is a framer.

An asymmetric channel controller 116 has an external interface on lines 118 and 120 for transceiving Polling messages with the PHY device 112. The asymmetric channel controller 116 has an output on line 122 to supply polling information. A credit flow controller 124 has an interface connected to the asymmetric channel controller on line 122 to receive the polling information. The credit flow controller 124 derives a transmission pattern from the supplied polling information, and estimates a PHY device buffer channel current capacity from the transmission pattern. The credit flow controller sends data scheduling commands (e.g., Xon/Xoff) to the CSM 105 responsive to the buffer channel current capacity estimate.

In one aspect, the credit flow controller 124 estimates an unused portion in a first channel buffer and sends a data scheduling command to the CSM to supply information. Typically, the segment of information is a predetermined first amount of information, which is typically the amount of information sent in previous transmissions, and closely related to the size of the PHY device buffer 114. However, if the information remaining in an untransmitted frame is less than the first amount, then this lesser amount of information makes up the information segment.

As is conventional, the asymmetric channel controller 116 initially sends Polling Request messages to the PHY device 112, and receives Polling Result messages from the PHY device 112. Polling information is supplied on line 122 responsive to these initial Polling messages. Using this polling information, the credit flow controller 124 is able to establish a transmission pattern that includes the first amount of information being transmitted to the first channel buffer and a period between transmissions. Once the transmission pattern is understood, the credit flow controller is able to send data scheduling commands to the CSM 105, before the asymmetric channel controller 116 receives the Polling Result message. Since the latency associated with waiting for the Polling Result message is removed, the overall efficiency of the communications between the CSM and the PHY device is improved.

Alternately expressed, the transmitter 108 sends information to the channel buffer 114 at a first bandwidth, and the credit flow controller 124 establishes a transmission pattern responsive to the first bandwidth. In one aspect of the system, the credit flow controller 124 establishes a gauge with an almost-empty watermark and an almost-full watermark, and estimates the gauge draining at a rate associated with the first bandwidth. The credit flow controller 124 sends a data scheduling command to the CSM 105 for supplying information in response to the gauge reaching the almost-empty watermark.

Figure 2:
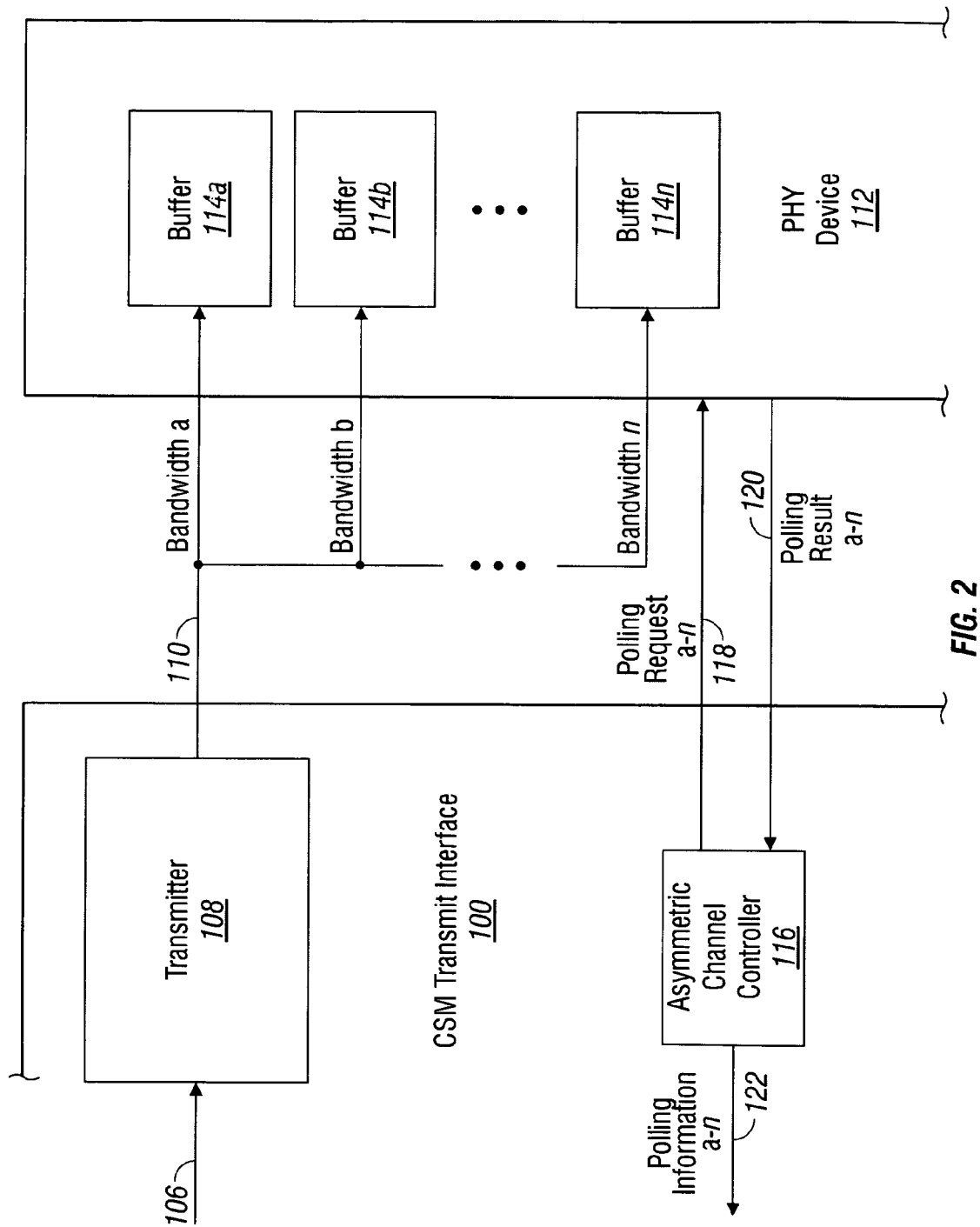
FIG. 2 is a schematic block diagram of the system shown in FIG. 1, with some additional details.

FIG. 2 is a schematic block diagram of the system shown in FIG. 1, with some additional details. As is conventional, the PHY device 112 services a plurality of parallel channels. Therefore, the transmitter 108 provides information to a plurality of PHY device channel buffers 114. Shown are buffers 114a, 114b, through 114n, where n is not limited to any particular number. The credit flow controller 124 estimates an unused portion in each of the plurality of channel buffers 114a-114n, and sends data scheduling commands to the CSM 105 for each channel buffer, responsive to estimating a corresponding channel buffer current capacity.

Unlike conventional CSM interface equipment, which provides information to each channel at the same bandwidth, transmitter 108 provides information to a plurality of channel buffers 114a-114n, at a corresponding plurality of bandwidths. That is, the bandwidth at which information is sent to buffer 114a may be different than the bandwidth used to send information to buffer 114b. The credit flow controller 124 estimates capacity in response to the channel bandwidth associated with each channel.

Alternately expressed, the transmitter 108 is able to operate at an overall effective bandwidth, and is able to service the PHY device buffers with any combination of channel bandwidths that do not exceed the overall bandwidth. As shown in more detail below, in one aspect the transmitter 108 may provide information in an optical carrier 48 (OC48) or synchronous transport signal 48 (STS48) accumulated bandwidth. The OC48 accumulated bandwidth may consist of one OC48, meaning the transmitter provides information to a single PHY device buffer at the OC48 rate. The OC48 accumulated bandwidth may also consist of two OC24, four OC12, sixteen OC3, forty-eight OC1, or combinations of the above-mentioned bandwidths.

In another aspect, the transmitter 108 provides information for transmission to the PHY device in accordance with a system packet interface 3 (SPI-3) protocol. However, the system 100 is not limited to any particular SPI, and the bandwidth need not necessarily be expressed in STS or OC protocol.

In the event that a change occurs to the physical layer link (not shown) or the device(s) communicating with PHY device 112, the information level in one or more of the buffers 114a-114n may change in a manner that deviates from the estimated transmission pattern. In this case, the conventional polling messages may be used to interrupt established patterns and/or establish new patterns. More specifically, the asymmetric channel controller 116 may receive a Polling Result message from the PHY device 112 indicating a channel buffer status such as an under-run or overrun, and supplies polling information to the credit flow controller. Then, the credit flow controller revises the estimate of a channel buffer current capacity in response to the polling information.

Functional Description

FIG. 3 is a diagram depicting exemplary asymmetric channel assignments. The above-describes asymmetric channel environment is a variation of a convention system packet interface such as SPI-3. In this context, combinations of channel bandwidths can be used, as long as the combination doesn't exceed the transmitter overall bandwidth. Thus, if the transmitter has an overall bandwidth equal to OC48, the following combinations are possible:

1×OC48;
2×OC24;
4×OC12;
16×OC3;
48×OC1;
1×OC24+1×OC12+4×OC3;
1×OC12+8×OC3+12×OC1; or
8×OC3+24×OC1.

Other combinations besides those given above are possible. The advantage to the asymmetric channel approach is the reduction in PHY device information transfer, as the system is able to eliminate some of the latency associated with the polling messages. Using an example of the transmitter bandwidth being divided as (1×OC12+8×OC3+12×OC1), the polling cycle for a conventional system would be 48 cycles+4 overhead cycles, based upon the bandwidth of the channel with the slowest bandwidth (OC1). However, using the system shown in FIGS. 1 and 2, the same information is transmitted with 21 polling cycles, plus overhead cycles, which reduces polling latency by 27 cycles.

The asymmetric channel controller may interact with the PHY device using a Direct Status Mode, Single Clav, or Multiplexed Clav polling mechanism. The asymmetric channel controller collects the polling information for each channel, which is send to the credit flow controller. The credit flow controller analyzes the polling information and sends data scheduling commands to the CSM. In one aspect, the data scheduling commands are simply Xon/Xoff commands.

The credit flow controller may track a number of settings for each channel. For example, pending data may be tracked, which is the amount of data already sent from the CSM, but not yet received by the PHY device. The credit flow controller may track the CSM burst size (the segment or amount of information sent by the CSM sent to the data FIFO in response to an Xon command), and the FIFO threshold for each channel, which is amount of data that can be accepted at a PHY device buffer when the polling results are positive for that channel. For example, the FIFO threshold may be expressed as a number of 16 byte words. Further, the credit flow controller may track the last received Polling Result message for each channel.

When the credit flow controller needs to define whether to send an Xon or Xoff command to the CSM, it compares the size of FIFO threshold, which is also described above, as a segment with a first amount of information, to the data (pending data) already sent to the channel buffer, but not yet received by the channel buffer. Thus, for any particular channel:

If (FIFO threshold−Pending data)<CSM Burst Size, then the Xoff command is sent to the CSM.

The asymmetric channel system prevents PHY device buffer overrun. The system also improves the latency in the transfer of data to the PHY device, because the CSM doesn't have to wait for the actual Polling Result messages. Rather, the CSM can transfer information to the data FIFO based on an estimate of the Polling Result message to be received.

Figure 4:
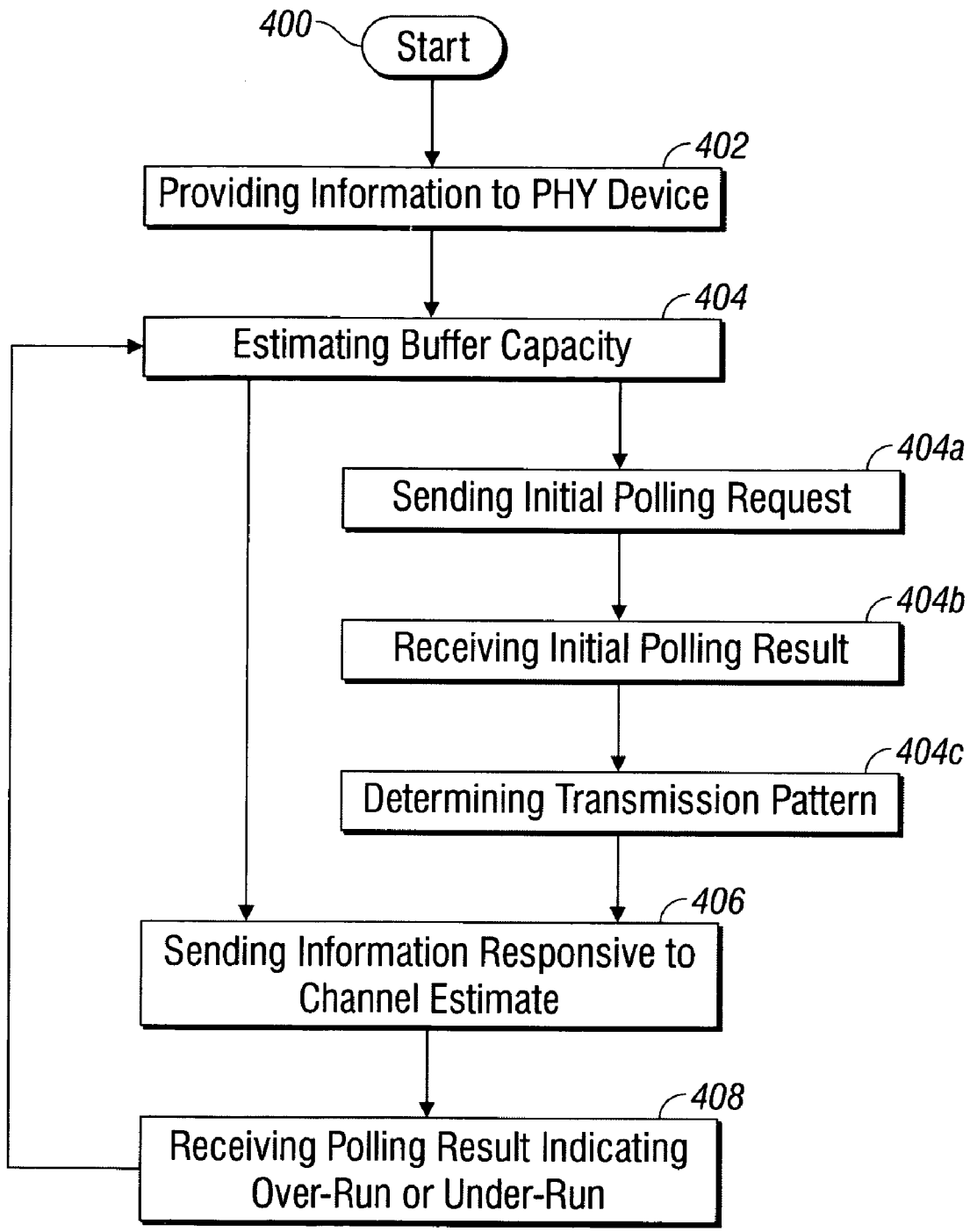
FIG. 4 is a flowchart illustrating a method for controlling information flow from a CSM in an asymmetric channel environment.

FIG. 4 is a flowchart illustrating a method for controlling information flow from a CSM in an asymmetric channel environment. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 400.

Step 402 provides information for transmission to an OSI model PHY layer device with a channel buffer. Step 404 estimates PHY device channel buffer current capacity. Prior to receiving a Polling Result message from the PHY device, Step 406 sends information to the channel buffer responsive to estimating the channel buffer capacity. For example, estimating the PHY device channel buffer current capacity in Step 404 includes estimating an unused portion in a first channel buffer. Then, sending information to the channel buffer in Step 406 sending a segment which is a predetermined first amount of information, typically less than, or equal to the estimated unused first channel buffer estimate, or any information remaining in an untransmitted frame, less than the first amount.

Estimating the first channel buffer capacity in Step 404 includes initial substeps. Step 404a initially sends Polling Request messages to the PHY device. Step 404b initially receives Polling Result messages from the PHY device. Step 404c determines a transmission pattern, including the first amount of information to transmit and a period between transmissions, in response to analyzing the Polling messages. Initially then, information is sent to the PHY device after receiving a Polling Result message. Once the transmission pattern is determined, Step 406 occurs before Step 404b. Alternately stated, information is sent in Step 406 as a result a Polling Result received for an earlier messaging cycle.

In one aspect, Step 402 provides information for transmission to the PHY device first channel buffer at a first bandwidth, and Step 404 determines a transmission pattern responsive to the first bandwidth. Considered from one perspective, the transmission pattern is determined in Step 404c as a result of establishing a gauge with an almost-empty watermark and an almost-full watermark, and draining the gauge at a rate associated with the first bandwidth. Then Step 406 sends information to the first channel buffer in response to the gauge reaching the almost-empty watermark. Alternately, Step 406 does not send information in response to gauge being near the almost-full watermark.

Typically, providing information for transmission to the PHY device in Step 402 includes providing information to a plurality of channel buffers. Then, estimating the PHY device channel buffer current capacity includes in Step 404 includes estimating an unused portion in each of the plurality of channel buffers. Likewise, sending information to the channel buffer in Step 406 then includes sending information to each channel buffer responsive to estimating a corresponding channel buffer current capacity.

Further, Step 402 may provide information to the plurality of channel buffers, at a corresponding plurality of bandwidths. Then, estimating the capacity of each of the plurality of channel buffers in Step 404 includes estimating capacity in response to the channel bandwidth associated with a corresponding channel. For example, Step 402 may provide information in an OC48 accumulated bandwidth, such as one OC48, two OC24, four OC12, sixteen OC3, forty-eight OC1, or combinations of the above-mentioned bandwidths. The information may also be provided in accordance with an SPI-3 protocol. However, the method is not limited to any particular SPI or communication protocol.

In one aspect, subsequent to sending information to the channel buffer, Step 408 receives a Polling Result message from the PHY device indicating an under-run or overrun buffer status. Then, Step 404 revises the estimate of channel buffer current capacity in response to the Polling Result message.

A system and method have been provided for controlling information flow in a CSM asymmetric channel environment. Examples of particular formats, protocols, and estimation techniques have been given to illustrate the invention. However, the invention is not limited to just these examples. Other variations and embodiments of the invention will occur to those skilled in the art.

We claim:

1. A method for controlling information flow from a channel service module (CSM) in an asymmetric channel environment, the method comprising:

providing information for transmission to an OSI model PHY layer device with a channel buffer;

estimating PHY device channel buffer current capacity as follows:

sending Polling Request messages to the PHY device;

receiving Polling Result messages from the PHY device; and, determining a transmission pattern, including an amount of information to transmit and a period between transmissions, in response to analyzing a plurality of Polling messages;

estimating an unused portion in a first channel buffer; and, prior to receiving a Polling Result message for a current Polling Request, sending information to the channel buffer responsive to estimating the current channel buffer capacity.

2. The method of claim 1 wherein sending information to the channel buffer responsive to estimating the channel buffer current capacity includes sending a segment selected from a group consisting of a first amount of information and any information remaining in an untransmitted frame, less than the first amount.

3. The method of claim 2 wherein providing information for transmission to the PHY device includes providing information to the first channel buffer at a first bandwidth; and, wherein estimating the first channel buffer capacity includes determining a transmission pattern responsive to the first bandwidth.

4. The method of claim 3 wherein determining the transmission pattern includes:

establishing a gauge with an almost-empty watermark; and, establishing a gauge almost-full watermark;

draining the gauge at a rate associated with the first bandwidth;

wherein sending information to the first channel buffer includes:

sending information in response to the gauge reaching the almost-empty watermark; and, not sending information in response to gauge being near the almost-full watermark.

5. The method of claim 1 wherein providing information for transmission to the PHY device includes providing information to a plurality of channel buffers;

wherein estimating the PHY device channel buffer current capacity includes estimating an unused portion in each of the plurality of channel buffers; and, wherein sending information to the channel buffer including sending information to each channel buffer responsive to estimating a corresponding channel buffer current capacity.

6. The method of claim 5 wherein providing information for transmission to the PHY device includes providing information to a plurality of channel buffers, at a corresponding plurality of bandwidths; and, wherein estimating the capacity of each of the plurality of channel buffers includes estimating capacity in response to the channel bandwidth associated with a corresponding channel.

7. The method of claim 6 wherein providing information to the plurality of channel buffers, with the corresponding plurality of bandwidths, includes providing information in an OC48 accumulated bandwidth selected from a group consisting of one OC48, two OC24, four OC12, sixteen OC3, forty-eight OC1, and combinations of the above-mentioned bandwidths.

8. The method of claim 1 wherein providing information for transmission to the PHY device with the channel buffer includes providing information in accordance with an SPI-3 protocol.

9. The method of claim 1 further comprising:

subsequent to sending information to the channel buffer, receiving a Polling Result message from the PHY device indicating a buffer status selected from a group consisting of under-run and overrun; and, revising the estimate of channel buffer current capacity in response to the Polling Result message.

10. In a channel service module (CSM) transmit interface, a system for controlling information flow in an asymmetric channel environment, the system comprising:

a data FIFO having a CSM interface to accept information and an output to supply information;

a transmitter having an interface to accept information from the data FIFO and an external interface for transmitting information to an OSI model PHY layer device with a channel buffer;

an asymmetric channel controller having an external interface for sending Polling Request messages to the PHY device and receiving Polling Result messages from the PHY device, and an output to supply polling information responsive to a plurality Polling messages; and, a credit flow controller having an interface connected to the asymmetric channel controller to receive the polling information, the credit flow controller deriving a transmission pattern, including an amount of information being transmitted to a first channel buffer and a period between transmissions, from the supplied polling information, estimating a PHY device buffer channel current capacity, including an unused portion of the first channel buffer, from the transmission pattern, and sending data scheduling commands to the CSM responsive to the buffer channel current capacity estimate.

11. The system of claim 10 wherein the credit flow controller sends a data scheduling command to the CSM to supply as segment of information selected from a group consisting of a first amount of information and any information remaining in an untransmitted frame, less than the first amount.

12. The system of claim 11 wherein the transmitter sends information to the first channel buffer at a first bandwidth; and, wherein the credit flow controller establishes a transmission pattern responsive to the first bandwidth.

13. The system of claim 12 wherein the credit flow controller establishes a gauge with an almost-empty watermark and an almost-full watermark, and estimates the gauge draining at a rate associated with the first bandwidth; and, wherein the credit flow controller sends a data scheduling command to the CSM for supplying information in response to the gauge reaching the almost-empty watermark.

14. The system of claim 10 wherein the transmitter provides information to a plurality of PHY device channel buffers; and, wherein the credit flow controller estimates an unused portion in each of the plurality of channel buffers, and sends data scheduling commands to the CSM for each channel buffer, responsive to estimating a corresponding channel buffer current capacity.

15. The system of claim 14 wherein the transmitter provides information to a plurality of channel buffers, at a corresponding plurality of bandwidths; and, wherein the credit flow controller estimates capacity in response to the channel bandwidth associated with each channel.

16. The system of claim 15 wherein the transmitter provides information in an OC48 accumulated bandwidth selected from a group consisting of one OC48, two OC24, four OC12, sixteen OC3, forty-eight OC1, and combinations of the above-mentioned bandwidths.

17. The system of claim 10 wherein the transmitter provides information for transmission to the PHY device in accordance with an SPI-3 protocol.

18. The system of claim 10 wherein the asymmetric channel controller receives a Polling Result message from the PHY device indicating a channel buffer status selected from a group consisting of under-run and overrun, and supplies polling information to the credit flow controller; and, wherein the credit flow controller revises the estimate of a channel buffer current capacity in response to the polling information.

* * * * *